Patented Feb. 2, 1937

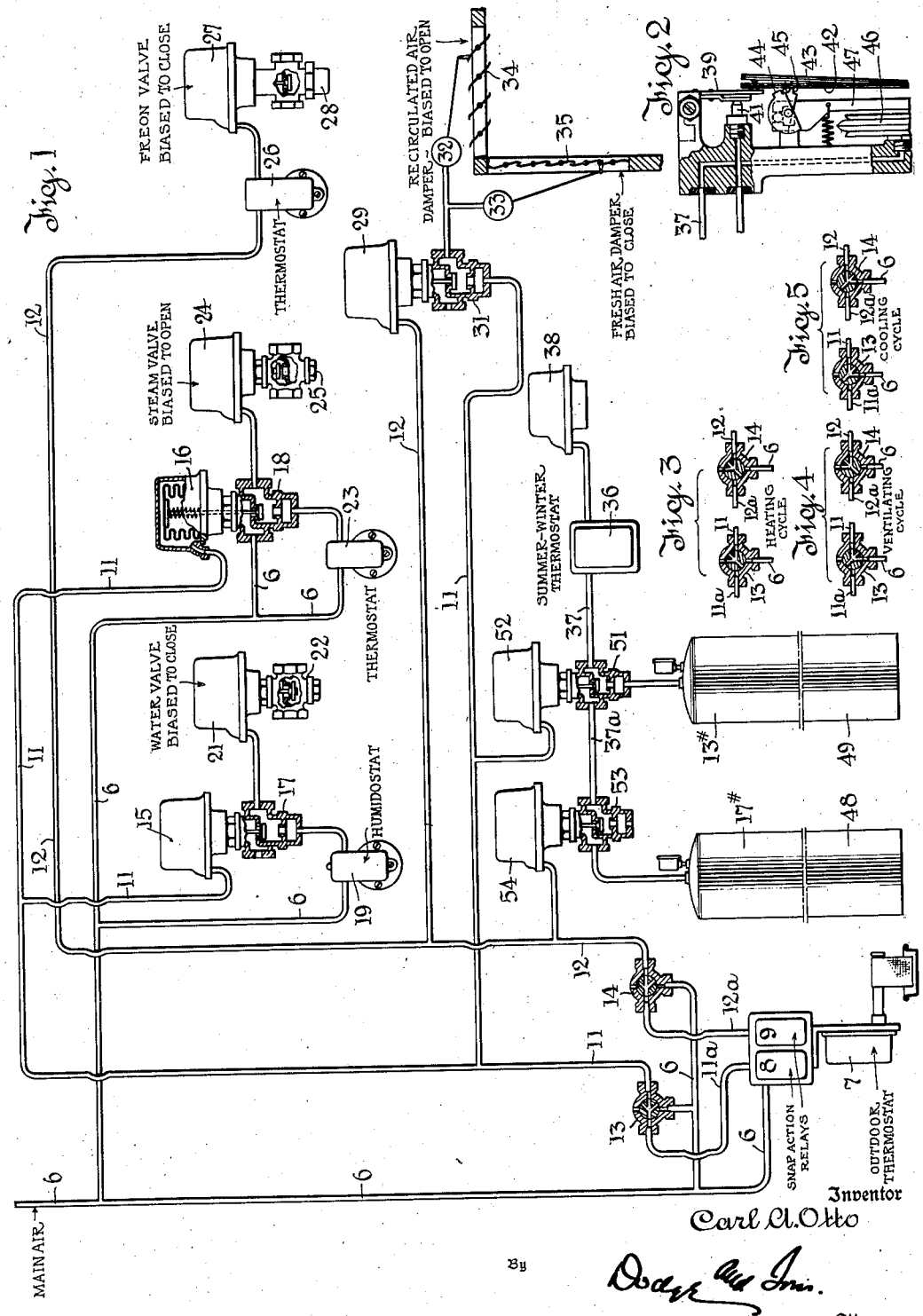

2,069,418

UNITED STATES PATENT OFFICE 2,069,418

TEMPERATURE REGULATION

Carl A. Otto, Milwaukee, Wis., assignor to Johnson Service Company, Milwaukee, Wis., a corporation of Wisconsin Application August 8, 1936, Serial No. 95,012

16 Claims. (Cl. 236—1)

This invention relates to the control of year-round conditioning and ventilating plants.

The present trend in the air conditioning art is toward the use of installations which are used continuously but function differently according to climatic conditions.

Under winter conditions, or say when outdoor temperature is below 65° F. the plant operates to heat and preferably also to humidify the air. Under summer conditions, or say when outdoor temperature is above 75° F. the plant operates to cool and dehumidify the air. Between 65° and 75° outdoor temperature the plant may be operated simply as a ventilating system, both the heating and the cooling means being wholly out of action. The temperatures above mentioned are dry bulb. If effective temperature is used to control, and this is proposed, appropriate values would be 63° and 70°.

The automatic control of such a plant, particularly with conventional thermostats and humidostats, which it is desirable to use because they are standardized and commercially available, is by no means a simple problem. The present invention involves principles which meet the needs of the situation and permit the successful use, in special combinations, of standard commercial units.

The basis of control is the use of two air lines which may each be charged or vented. One line puts into and out of action the heating-humidifying unit together with its controls. The other line similarly puts into and out of action the cooling-dehumidifying unit. Either line may also furnish the supply of motive fluid to apparatus controlled by the other line, so as to effect a joint control.

In this way it is possible to establish at least three operating conditions by using combinations of line condition:—

(1) Both lines vented
(2) One line charged, the other vented.
(3) Both lines charged.

A fourth permutation, similar to (2) but the reverse thereof, is mathematically possible, but would be needed only if some fourth character of control were added, and hence need not be discussed.

In the exemplary embodiment hereinafter described, the two lines in question operate to put the heating-humidifying unit and its associated automatic controls into action selectively with respect to the cooling-dehumidifying unit and its associated automatic controls, and operate also to shut both units down, and open ventilating dampers.

In addition to the automatic controls directly associated with the units there are usually room (or zone) thermostats which control delivery to the room of air conditioned by the unit. These room units must be reversible in their regulating effect according as heating or cooling is in progress. Regulation by the two branch lines above mentioned can be applied to effect the desired reversal of such a room thermostat and to shut down this room thermostat when ventilation without artificial conditioning is in progress.

While the charging and venting of the two lines can be effected by manual control, automatic control can be effected by a two-point thermostat subject to an independent temperature, conveniently but not necessarily outdoor temperature and preferably outdoor effective temperature (combined wet and dry bulb). The two point thermostat changes the condition of charge of one line at one of its control points and changes the condition of charge of the other line at its other control point.

For purpose of explanation a control system will now be described in which both lines are vented to establish heating conditions. On rising outdoor (or related) temperature one line only is charged at the first control point to establish ventilating conditions, and then at the second control point the second line is charged (without venting the first) thus establishing cooling condition.

In the drawing,—

Fig. 1 is a diagram of the control system with the manual valves set for automatic control.

Fig. 2 is a sectional view of a reversible two-bar winter-summer thermostat.

Figs. 3, 4 and 5 are diagrams of the manually set valves, showing them in position for heating, ventilating and cooling respectively. In these settings they cut out automatic control by the two point thermostat.

The main air supply line, leading from any suitable source of air under pressure (not shown) is indicated at 6 together with the various branches thereof. This line supplies the master thermostat 7, of known construction, here assumed to be an outdoor, effective temperature two point instrument with control points at 63° and 70°. Thermostat 7 operates through two positive (snap action) relays 8 and 9, also of known construction. Below 63° both relays vent their branch connections 11a and 12a. At 63° thermostat 7 operates relay 8 to put pressure on connection 11a, and at 70° operates relay 9 to put pressure on branch connection 12a. Interposed between connection 11a and line 11 and between connection 12a and line 12 are manually operable multiple way cocks 13 and 14. Each has a supply branch from line 6 and a vent port, as shown.

As positioned in Fig. 1 the supply and vent ports are closed and branch lines 11a, 11 and 12a, 12, are respectively connected through the cocks.

This is automatic setting with thermostat 7 in control. In the other three settings thermostat 7 is cut out. In heating setting (Fig. 3) both lines 11 and 12 are vented, in ventilating setting (Fig. 4) line 11 is charged and 12 vented, and in cooling setting (Fig. 5) both 11 and 12 are charged.

The cocks 13 and 14 are merely to permit the system to be set permanently for any chosen cycle, thus suspending automatic control. They can be omitted.

Branch line 11 leads to the motors 15 and 16 of two three-way valves 17 and 18. These are similar and 18 is sectioned to indicate construction. When line 11 is vented valve 17 connects humidostat 19 in controlling relation with motor 21 of humidifying water valve 22 which is normally closed but may be forced progressively open when the humidostat, in response to low humidity, admits pressure fluid to motor 21. Humidostat 19 receives motive fluid from line 6. When line 11 is charged valve 17 disconnects motor 21 from the humidostat, and vents the motor so that valve 22 closes.

When line 11 is vented, valve 18 connects thermostat 23 in controlling relation with motor 24 of steam valve 25 (typifying any heating means). Valve 25 is biased to open and closes as thermostat 23 supplies pressure fluid in response to rising temperature. When line 11 is charged valve 18 disconnects thermostat 23 from motor 24 and admits main line pressure to the motor to hold the steam valve 25 closed.

Line 12 serves as the supply line for thermostat 26 connected to control the motor 27 of the refrigerant valve 28. This valve is biased to close and opens only when thermostat 26 supplies motive fluid to motor 27 in response to rising temperature. If line 12 is vented motor 27 is vented and valve 28 closes.

Line 12 also leads to motor 29 of three-way valve 31. The valve is biased to the position shown in Fig. 1 in which a branch of line 11 is connected with the damper motors 32 and 33 of the recirculation dampers 34 (biased to open) and fresh air dampers 35 (biased to close). If line 12 is under pressure motor 29 shifts valve 31 to disconnect motors 32 and 33 from line 11 and vents the motors.

It follows that if lines 11 and 12 are both charged, or are both vented, motors 32 and 33 are vented so that recirculation dampers 34 are open and fresh air dampers 35 closed. The damper positions are reversed only if line 11 is charged while line 12 is vented (see Fig. 4). In that case pressure fluid supplied by line 11 shifts motors 32 and 33.

The above controls take care of controls local to the conditioner.

|  | Heating | Ventilating | Cooling |
|---|---|---|---|
| Heat valve and control. | Active | Inactive | Inactive. |
| Humidifier and control. | Active | Inactive | Inactive. |
| Refrigeration and control. | Inactive | Inactive | Active. |
| Dampers | Recirculation | Fresh air | Recirculation. |

The effect is to provide for conversion between three cycles at the conditioner and furnish air at one uniform condition for heating and at another uniform condition for cooling. To regulate conditions in the rooms thermostats are used to vary the rate at which conditioned air is delivered.

Under heating conditions the rate must be reduced by rising temperature, while under cooling conditions the rate must be increased by rising temperature. Under ventilating conditions the rate control should be eliminated. The patent to Otto No. 2,021,263, issued November 19, 1935, discloses a thermostat having two bars reversely operating, independently adjustable, and capable of selectively controlling a single leak port. Selection between the two bars is made by changing the pressure of air supplied to the thermostat so that at one supply pressure the thermostat exercises control appropriate to heating and at another supply pressure a control appropriate to cooling.

In Fig. 1 such a thermostat is indicated at 36. Several such thermostats, one for each of various rooms or zones may be supplied by the same air line 37 and each may control a corresponding motor 38, which by any known means (not shown) regulates the supply of conditioned air to a corresponding room.

Fig. 2 shows the essential elements of such a thermostat. The hinged lid 39, biased to open, controls leak port 41. Two relatively reversely acting thermostatic bars 42, 43, yieldingly supported at their lower ends, as shown in said Otto patent, may act to force lid 39 in a closing direction, but only one can act at a time since the cams 44, 45, on a common shaft, act to hold them selectively out of action. A bellows motor 46 subject to pressure in line 37 acts through lever 47 to shift the cams.

In Fig. 1, 48 represents a pressure source at 17 pounds gage, and 49 a source at 13 pounds gage.

A three way valve 51, biased to the position shown, normally connects low pressure source 49 with line 37, but when line 11 is charged a motor 52 connected to line 11, shifts valve 51 to isolate source 49 and connect lines 37 and 37a. A three way valve 53, biased to the position shown, normally vents line 37a to atmosphere, but when line 12 is charged a motor 54 shifts valve 53 to close the atmospheric vent and connect high pressure source 48 with line 37a.

The conditions are as follows:

*Heating condition*—both lines 11 and 12 vented, are supplied at 13 pounds to thermostat 36.

*Ventilating condition*—line 12 vented, 11 charged, line 37 vented via 37a, thermostat 36 and motor 38 inactive.

*Cooling condition*—lines 11 and 12 charged, air supplied from source 48 at 17 pounds via 37a to 37 and hence to thermostat 36.

In this way the convertible thermostat is rendered active in each sense, and inactive selectively.

The system above described gives automatic or manual conversion to three operative phases for the system as a whole. It also connects the local thermostat (or local thermostats if more than one is used) so that they operate in consonance with the phase in effect.

Pneumatic thermostats that put pressure in branch lines in response to fall of temperature are known and may be used with obvious revisions of connections and other features such as the bias of valves. These changes fall within the broad scope of the invention which is directed to control of three phases by charging and venting two lines, either with or without the related control of reversible thermostats.

What is claimed is:

1. The combination of a conditioning plant including heating means, cooling means and motor-operated dampers controlling air circulation in the system; two regulatory pressure lines arranged to control through the establishment and dissipation of pressure therein, one of said lines being connected to control the heating means, the other line being connected to control the cooling means, and the two lines being also connected to exercise conjoint control on said dampers; and means operable to charge both lines, vent both, or charge one and vent the other, to establish three operating conditions for said conditioning plant.

2. The combination of a conditioning plant including heating means, a thermostatic control therefor, cooling means, a thermostatic control therefor, and motor-operated dampers controlling air circulation in the system; two regulatory pressure lines arranged to control through the establishment and dissipation of pressure therein, one of said lines being connected to control the heating means, the other line being connected to control the cooling means, and the two lines being also connected to exercise conjoint control of said dampers; and means operable to charge both lines, vent both, or charge one and vent the other, to establish three operating conditions for said conditioning plant.

3. The combination of a conditioning plant including heating means, a temperature-responsive control therefor, humidifying means, a humidity-responsive control therefor, cooling means, a temperature-responsive control therefor, and motor-operated dampers controlling air circulation in the system; two regulatory pressure lines arranged to control through the establishment and dissipation of pressure therein, one of said lines being connected to control the heating means, the other line being connected to control the cooling means, and the two lines being also connected to exercise conjoint control of said dampers; and means operable to charge both lines, vent both, or charge one and vent the other, to establish three operating conditions for said conditioning plant.

4. The combination of a conditioning plant including heating means, cooling means and motor-operated dampers controlling air circulation in the system; two regulatory pressure lines arranged to control through the establishment and dissipation of pressure therein, one of said lines being connected to control the heating means, the other line being connected to control the cooling means, and the two lines being also connected to exercise conjoint control on said dampers; means operable by temperature changes to charge both lines, vent both, or charge one and vent the other, to establish three operating conditions for said conditioning plant, said temperature-responsive means being subject to a temperature unaffected by the conditioning plant but functionally related to the temperature which the conditioning plant operates to correct.

5. The combination of a conditioning plant including heating means, cooling means and motor-operated dampers controlling air circulation in the system; two regulatory pressure lines arranged to control through the establishment and dissipation of pressure therein, one of said lines being connected to control the heating means, the other line being connected to control the cooling means, and the two lines being also connected to exercise conjoint control on said dampers; means operable to charge both lines, vent both, or charge one and vent the other, to establish three operating conditions for said conditioning plant; and an outdoor thermostat for controlling operation of said line charging and venting means.

6. The combination of claim 5 further characterized in that the outdoor thermostat for controlling the line charging and venting means is of the effective temperature type.

7. The combination of a conditioning plant including heating means, cooling means and motor-operated dampers controlling air circulation in the system; two regulatory pressure lines arranged to control through the establishment and dissipation of pressure therein, one of said lines being connected to control the heating means, the other line being connected to control the cooling means, and the two lines being also connected to exercise conjoint control on said dampers; means operable to charge both lines, vent both, or charge one and vent the other, to establish three operating conditions for said conditioning plant; and a multi-point thermostat controlling operation of said line charging and venting means, said thermostat being operable within a certain temperature range to establish one of said three operating conditions for the conditioning plant, operable within a second temperature range to establish another of said operating conditions, and operable within a third temperature range to establish the remaining operative condition.

8. The combination of a thermostatic control device adapted for adjustment to respond in reverse senses to temperature changes; two regulatory lines adapted to control through pressure conditions therein; and means operable in response to pressure conditions in both of said lines to effect said adjustment of the thermostatic control device.

9. The combination of claim 8 further characterized in that said adjusting means for the thermostatic control device are fluid pressure actuated and that means are provided to vary, in response to pressure conditions in both of said regulatory lines, the pressure of pneumatic supply to actuate said adjusting means.

10. The combination of a thermostatic control device adapted for adjustment to respond in reverse senses to temperature changes; two regulatory lines adapted to control through the establishment and dissipation of pressure therein; means operable in response to pressure conditions in both of said lines to effect said adjustment of the thermostatic control device; and means operable to charge or vent said lines and thereby control pressure conditions therein.

11. The combination of pneumatic motor means for actuating fluid flow regulating means; a thermostatic valve mechanism for controlling said motor means; two regulatory lines adapted to control through pressure conditions therein; and means, responsive to pressure conditions in both of said lines, to reverse, with respect to temperature, the action of said thermostatic valve mechanism on said motor means.

12. The combination of pneumatic motor means for actuating fluid flow regulating means; a thermostatic valve mechanism for controlling said motor means; two regulatory lines adapted to control through pressure conditions therein; and means, responsive to pressure conditions in both of said lines, either to reverse, with respect to temperature, the action of said thermostatic valve mechanism on said motor means, or to render said thermostatic valve mechanism inoperative to control the motor means.

13. The combination of a conditioning plant including heating means, cooling means and motor-operated dampers controlling air circulation in the system; two regulatory pressure lines arranged to control through the establishment and dissipation of pressure therein, one of said lines being connected to control the heating means, the other line being connected to control the cooling means, and the two lines being also connected to exercise conjoint control on said dampers; means operable to charge both lines, vent both, or charge one and vent the other, to establish three operating conditions for said conditioning plant; a thermostatic device adapted to control means for regulating flow of at least a portion of the air in the system; and means, operable in response to pressure conditions in both of said regulatory lines, to reverse, with respect to temperature, the action of said thermostatic device on said air flow regulating means.

14. The combination of a conditioning plant including heating means, cooling means and motor-operated dampers controlling air circulation in the system; two regulatory pressure lines arranged to control through the establishment and dissipation of pressure therein, one of said lines being connected to control the heating means, the other line being connected to control the cooling means, and the two lines being also connected to exercise conjoint control on said dampers; means operable to charge both lines, vent both, or charge one and vent the other, to establish three operating conditions for said conditioning plant; pneumatic motor means adapted to actuate means for regulating flow of at least a portion of the air in the system; a thermostatic valve mechanism for controlling said motor means; and means, responsive to pressure conditions in both of said regulatory lines, either to reverse, with respect to temperature, the action of said thermostatic valve mechanism on said motor means, or to render said thermostatic valve means inoperative to control the motor means.

15. The combination of a conditioning plant including heating means, cooling means and motor-operated dampers controlling air circulation in the system; two regulatory pressure lines arranged to control through the establishment and dissipation of pressure therein, one of said lines being connected to control the heating means, the other line being connected to control the cooling means, and the two lines being also connected to exercise conjoint control on said dampers; means operable to charge both lines, vent both, or charge one and vent the other, to establish a heating condition, a cooling condition, or a ventilating condition for said conditioning plant; a thermostatic device adapted to control means for regulating flow of at least a portion of the air in the system; and means, operable in response to pressure conditions in both of said regulatory lines, either to reverse, with respect to temperature, the action of said thermostatic device on said air flow regulating means, according as said heating or said cooling condition is established, or to render said thermostatic device inoperative to control the air flow regulating means when said ventilating condition is established.

16. The combination of a conditioning plant including heating means, cooling means and motor-operated dampers controlling air circulation in the system; two regulatory pressure lines arranged to control through the establishment and dissipation of pressure therein, one of said lines being connected to control the heating means, the other line being connected to control the cooling means, and the two lines being also connected to exercise conjoint control on said dampers; means operable to charge both lines, vent both, or charge one and vent the other, to establish a heating condition, a cooling condition or a ventilating condition for said conditioning plant; an outdoor thermostat for controlling operation of said line charging and venting means; a thermostatic device, responsive to air temperature in the system, to control means for regulating flow of at least a portion of the air in the system; and means, operable in response to pressure conditions in both of said regulatory lines, to reverse, with respect to temperature, the action of said thermostatic device on said air flowing regulating means according as said heating or said cooling condition is established.

CARL A. OTTO.